United States Patent
Kuniya

(10) Patent No.: US 9,147,137 B2
(45) Date of Patent: Sep. 29, 2015

(54) LABEL PRINTER, AND METHOD OF SEARCHING OPTIMAL COMMUNICATION POSITION

(71) Applicant: TOSHIBA TEC KABUSHIKI KAISHA, Shinagawa-ku, Tokyo (JP)

(72) Inventor: Yoshitaka Kuniya, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 69 days.

(21) Appl. No.: 14/154,640

(22) Filed: Jan. 14, 2014

(65) Prior Publication Data

US 2015/0199594 A1  Jul. 16, 2015

(51) Int. Cl.
| | |
|---|---|
| *G06F 15/00* | (2006.01) |
| *G06K 15/02* | (2006.01) |
| *G06K 7/00* | (2006.01) |
| *G06K 19/07* | (2006.01) |
| *G06K 15/16* | (2006.01) |
| *G06K 19/077* | (2006.01) |

(52) U.S. Cl.
CPC ............ *G06K 15/024* (2013.01); *G06K 7/0008* (2013.01); *G06K 15/022* (2013.01); *G06K 15/16* (2013.01); *G06K 19/0723* (2013.01); *G06K 19/07718* (2013.01); *G06K 19/07749* (2013.01)

(58) Field of Classification Search
CPC .......................... G06K 15/024; G06K 19/0776
USPC ....................................................... 358/1.15
See application file for complete search history.

(56) References Cited

U.S. PATENT DOCUMENTS

2010/0181379 A1*  7/2010  Okegawa et al. ............. 235/488

FOREIGN PATENT DOCUMENTS

| JP | 2006-272844 | 10/2006 |
|---|---|---|
| JP | 2006-338179 | 12/2006 |

* cited by examiner

Primary Examiner — Saeid Ebrahimi Dehkord
(74) Attorney, Agent, or Firm — Amin, Turocy & Watson, LLP

(57) ABSTRACT

According to an embodiment, there is provided a label printer including a conveying mechanism, an RFID reader and writer, a communication intensity information acquisition unit, and a maximum communication intensity position determination unit, and an optimal communication position calculation unit. If communication with the plurality of RFID tags occurs simultaneously in the RFID reader and writer while conveying the mount by the conveying mechanism along the conveying route, the communication intensity information acquisition unit acquires information indicating a communication intensity between each of a plurality of the RFID tags and the RFID reader and writer in correlation with identification information of each of the RFID tags. The maximum communication intensity position determination unit determines a maximum communication intensity position, at which a communication intensity capable of being correlated with the identification information of each of the RFID tags becomes the maximum, on the basis of a tendency of a variation in the communication intensity of each of the plurality of RFID tags which accompanies the conveyance along the conveying route, and a conveying distance of the mount by the conveying mechanism. The optimal communication position calculation unit calculates an optimal communication position with the RFID tags of the plurality of labels adhered to the label paper on the basis of the maximum communication intensity position determined with respect to each of the plurality of RFID tags.

14 Claims, 12 Drawing Sheets

FIG. 10

| Position [mm] | AGC (0-15) | ID | Write success (OK/NG) |
|---|---|---|---|
| 0 | 3 | 1 | NG |
| 3 | 8 | 1 | OK |
| 6 | 5 | 1 | OK |
| 9 | 2 | 2 | OK |
| 12 | 10 | 2 | OK |
| 15 | 3 | 2 | NG |
| 18 | 5 | 3 | OK |
| 21 | 7 | 3 | OK |

FIG. 12

| Position [mm] | AGC (0-15) | ID | Write success (OK/NG) |
|---|---|---|---|
| 0 | 8, 3 | 1 | OK |
| 3 | 8, 3 | 1 | OK |
| 6 | 9, 4 | 1 | OK |
| 9 | 10, 5 | 1 | OK |
| 12 | 11, 5 | 1 | NG |
| 15 | 10, 6 | 1 | OK |
| 18 | 9, 7 | 1 | OK |
| 21 | 8, 9 | 2 | OK |

LABEL PRINTER, AND METHOD OF SEARCHING OPTIMAL COMMUNICATION POSITION

FIELD

Embodiments described herein relate generally to a technology of automatically searching an optimal writing position to an RFID in a label printer.

BACKGROUND

In the related art, a roll sheet or a fanfold sheet in which an RFID tag is embedded in each of a plurality of labels adhered to a long-length mount is known. In correspondence with this, development of a label printer provided with a print function onto the label, and an RFID communication function of writing desired data to the RFID tag provided to the label is in progress.

The label printer is provided with a printing unit including a thermal head and the like, and an RFID reader and writer that carries out communication with the RFID tag. Generally, the RFID reader and writer is disposed upstream of the printing unit on a label paper conveying route in relation to the printing unit. Further, the RFID reader and writer and the thermal head are disposed to be spaced apart from each other so as not to interfere with each other.

The label printer receives a data set including RFID data and print data from a computer with which data communication is established, and carries out data writing-in and printing with respect to the label on the basis of the received data set, thereby printing and publishing the label.

In the label printer of the related art, for accurate writing-in and reading-in from the RFID reader and writer to the RFID tag, a technology of automatically adjusting an optimal communication position of the RFID tag with respect to the RFID reader and writer is known.

However, in the automatic adjustment technology of the related art, if communication with a plurality of the RFID tags occurs simultaneously in the RFID reader and writer during the automatic adjustment process, there is a problem in that it is difficult to determine which directed optimal value corresponds to which label.

DESCRIPTION OF THE DRAWINGS

FIG. 10 is a data table illustrating a variation of AGO and a success rate of writing-in when gradually conveying a mount by a conveying mechanism.

FIG. 12 is a data table illustrating the variation of AGC and the success rate of writing-in in the case of gradually conveying the mount by the conveying mechanism.

DETAILED DESCRIPTION

According to an embodiment, a label printer includes a conveying mechanism, an RFID reader and writer, a communication intensity information acquisition unit, and a maximum communication intensity position determination unit, and an optimal communication position calculation unit. The conveying mechanism conveys label paper, in which a plurality of labels including an RFID tag adhere to a long-length mount with a predetermined pitch along a longitudinal direction of the mount, along a conveying route. The printing unit carries out printing with respect to the labels on the conveying route. The RFID reader and writer is provided upstream of the conveying route in relation to the printing unit, and carries out reading-in and writing-in of information with respect to the RFID tag included in each of the label. The communication intensity information acquisition unit acquires information indicating a communication intensity between each of a plurality of the RFID tags and the RFID reader and writer in correlation with identification information of each of the RFID tags, if communication with the plurality of RFID tags occurs simultaneously in the RFID reader and writer while conveying the mount by the conveying mechanism along the conveying route. The maximum communication intensity position determination unit determines a maximum communication intensity position, at which a communication intensity capable of being correlated with the identification information of each of the RFID tags becomes the maximum, on the basis of a tendency of a variation in the communication intensity of each of the plurality of RFID tags which accompanies the conveyance along the conveying route, the communication intensity being acquired by the communication intensity information acquisition unit, and a conveying distance of the mount by the conveying mechanism. The optimal communication position calculation unit calculates an optimal communication position with the RFID tags of the plurality of labels adhered to the label paper on the basis of the maximum communication intensity position determined by the maximum communication intensity position determination unit with respect to each of the plurality of RFID tags.

Hereinafter, a configuration of the label printer according to the embodiment of the invention will be described with reference to the attached drawings.

Description of Device

Figure 1:
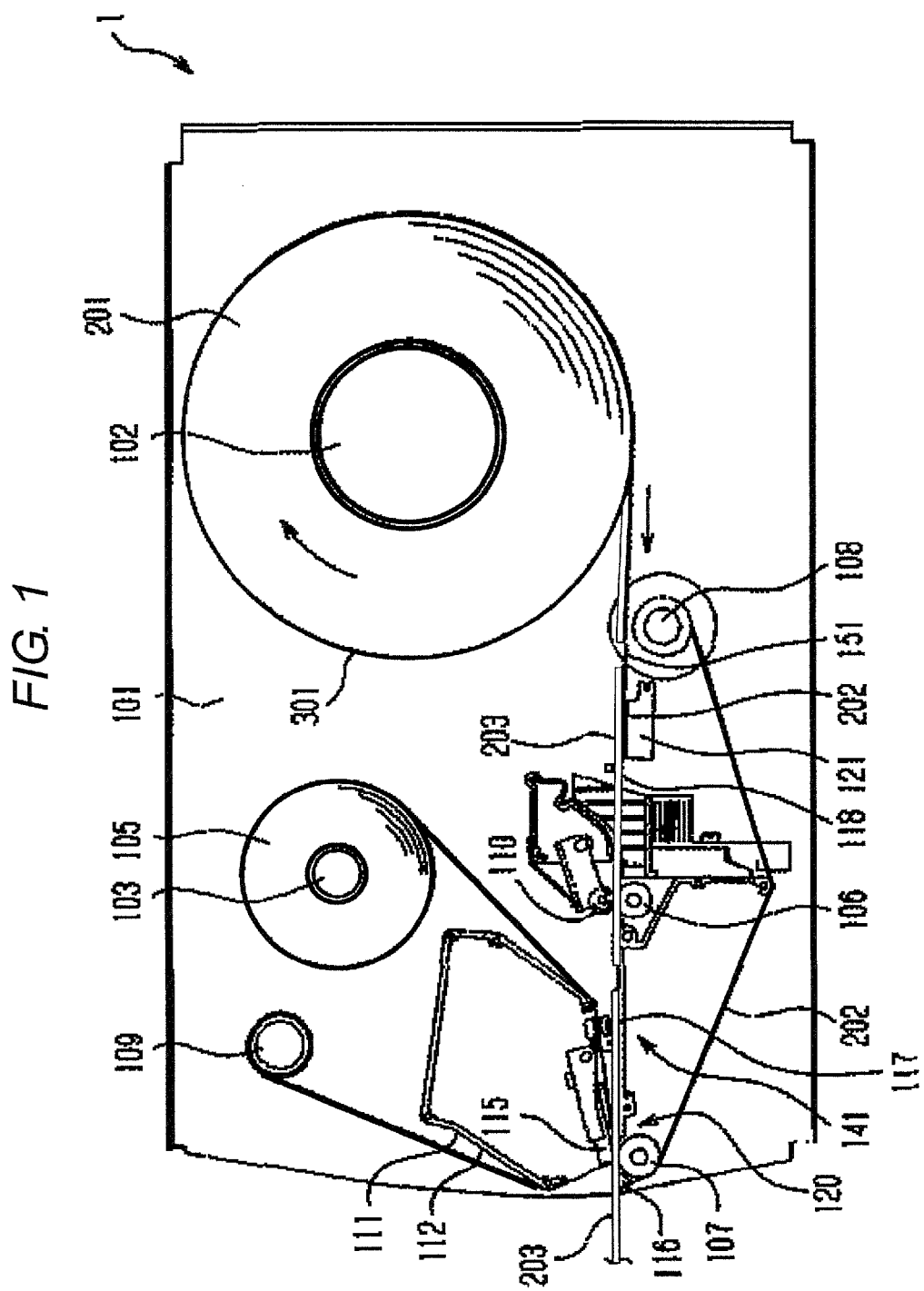
FIG. 1 is a longitudinal side view of a label printer.

FIG. 1 shows an example of a longitudinal side view of a label printer 1 according to the embodiment. The label printer 1 includes a printer main body unit 101. One end of a label paper holding shaft 102 as a holding unit and one end of an ink ribbon holding shaft 103 are fixed to the printer main body unit 101. The label paper holding shaft 102 rotatably holds label paper 201 that is wound in a roll shape, and the ink ribbon holding shaft 103 holds an ink ribbon 105 that is wound in a roll shape.

The label paper 201 is paper in which labels 203 adhere to a long-length mount 202 with a constant distance. An RFID tag 206 including an IC chip and an antenna is embedded in each of the labels 203. Each of the label 203 has a region in which printing by a thermal head 115, to be described later, is possible.

The label printer 1 includes a conveying mechanism 141, a printing unit 120, and an RFID reader and writer 121. In addition, the label printer 1 includes a reflection type sensor 117 that contributes to detection of a label position when carrying out printing on the label, and a reflection type sensor 118 that contributes to the detection of a label position when writing data on the label. These sensors are used for positioning of the label 203 when conveying the label paper 201 by the conveying mechanism 141.

The conveying mechanism 141 includes a conveying roller 106, a pinch roller 110, a platen 107, the thermal head 115, a motor 55 (refer to FIG. 2), and the like, and applies a conveying force to the roll-shaped label paper 201 that is held to the label paper holding shaft 102 to pull out and convey the label paper 201. More specifically, the conveying roller 106 which is connected to the motor 55 and is driven to rotate, the platen 107, a rewinder 108, and one end of a ribbon winding shaft 109 are rotatably held to the printer main body unit 101, and the pinch roller 110 is brought into contact with an outer circumferential surface of the conveying roller 106 with a predetermined pressure. Further, a head block 111 including a casing 112 of which a lower end on a platen 107 side is opened, and the thermal head 115 that comes into contact with an outer circumferential surface of the platen 107 is fixed to the printer main body unit 101 at a position in the vicinity of the platen 107.

The label paper 201 pulled out from a roll state passes between the conveying roller 106 and the pinch roller 110, and passes between the platen 107 and the thermal head 115. In the label printer 1, the label paper 201 is conveyed along this conveying route 151.

In addition, a mount 202 of the label paper 201 passed through between the platen 107 and the thermal head 115 is bent by a label peeling body 116 and is rewound around the rewinder 108, and a label 203 of the label paper 201 is peeled from the mount 202 and is allowed to go straight. On the other hand, the ink ribbon 105 that is held to the ink ribbon holding shaft 103 in a roll state passes between the platen 107 and the thermal head 115 after being pulled out from the roll state and is wound around the ribbon winding shaft 109.

The printing unit 120 receives a printing command from a CPU 51 (refer to FIG. 2), to be described later, and carries out printing data transmitted from the CPU 51 with respect to the label 203 positioned at a printing standby position PO on the conveying route 151. The printing unit 120 is constituted by, for example, the thermal head 115, the platen 107, and the like.

The reflection type sensor 117 is disposed in the vicinity of the thermal head 115. The reflection type sensor 117 projects detection light toward the label paper 201 that is conveyed on the conveying route 151, receives reflected light that is reflected from the mount 202 or the label 203 by a light receiving unit, and transmits a detection level of the reflected light that is received by the light receiving unit to the CPU 51.

The CPU 51 detects whether or not the label 203 is positioned at a predetermined printing standby position PO on the basis of the detection level of the reflected light which is input from the reflection type sensor 117, and a conveying distance conveyed on the conveying route 151 by drive-control of the conveying mechanism 141. That is, the reflection type sensor 117 and the CPU 51 function as printing position detection units detecting whether or not the label 203 is positioned at the predetermined printing standby position PO (refer to FIG. 8, to be described later).

The RFID reader and writer 121 is positioned at a lower surface side that is one surface side of the conveying route 151 between the conveying roller 106 and the rewinder 108, and is fixed to the printer main body unit 101. The RFID reader and writer 121 is provided with a reader and writer antenna at the inside thereof, carries out wireless communication with respect to an RFID tag included in the label 203 positioned at a writing position W and a position nearest to the writing position W, and carries out writing of RFID data transmitted from the CPU 51.

The reflection type sensor 118 is disposed in the vicinity of the RFID reader and writer 121. The reflection type sensor 118 projects detection light toward a top surface of the label paper 201 that is conveyed on the conveying route 151, receives reflected light that is reflected from the mount 202 or the label 203 by a light receiving unit, and transmits a detection level of the reflected light that is received by the light receiving unit to the CPU 51. The CPU 51 detects whether or not the label 203 is positioned at a predetermined writing position corresponding to the RFID reader and writer 121 on the basis of a variation in the detection level of the reflected light which is input from the reflection type sensor 118, and a conveying distance on the conveying route 151 by drive-control of the conveying mechanism 141. That is, the reflection type sensor 118 and the CPU 51 function as writing position detection units detecting whether or not the label 203 is positioned at the predetermined writing position.

Figure 2:
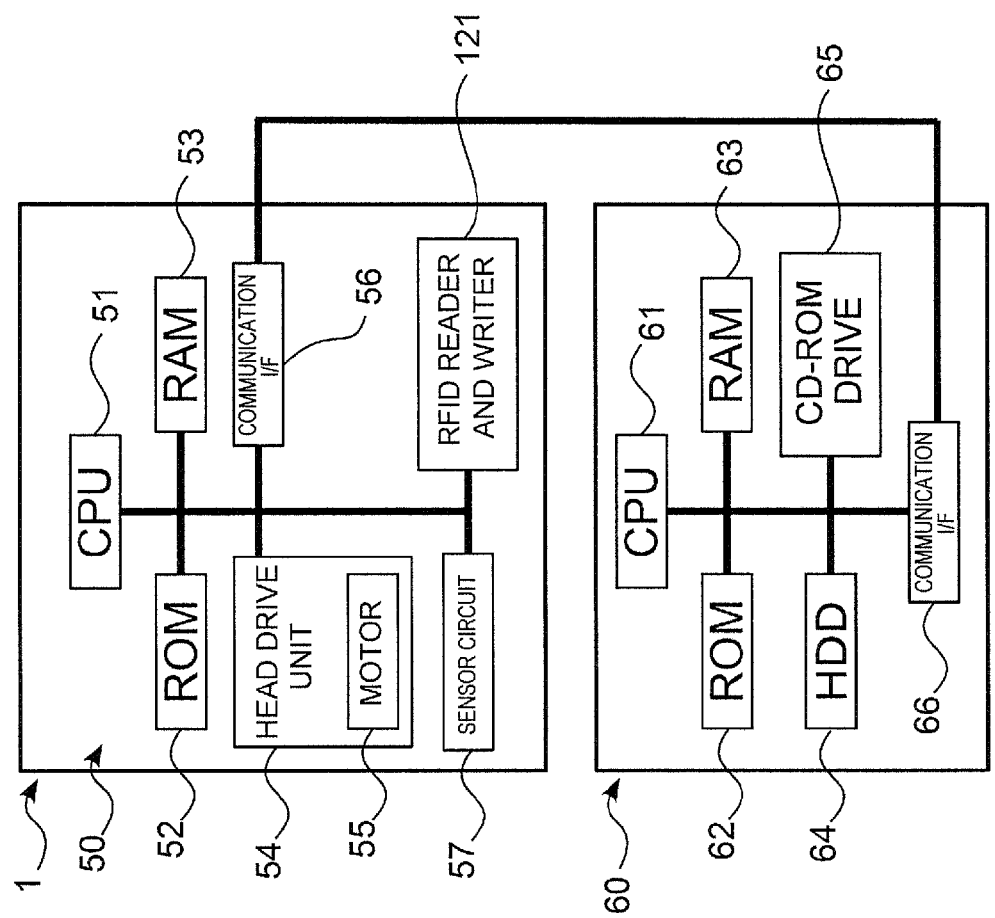
FIG. 2 is a control block diagram illustrating a hardware configuration of the label printer.
Figure 3:
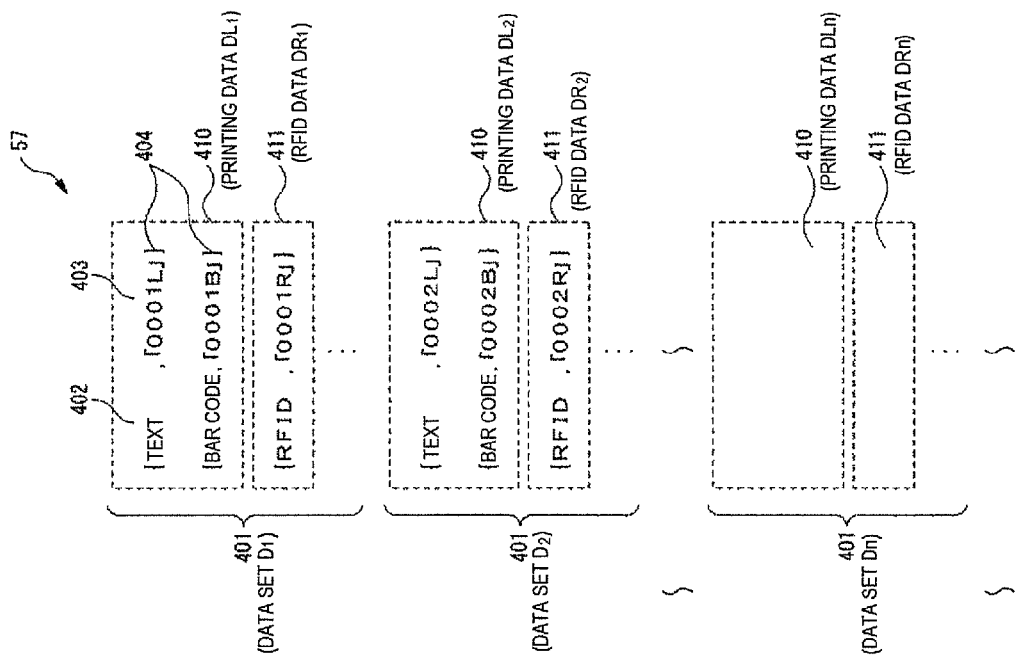
FIG. 3 is a view illustrating an example of a data set written in an RFID tag.

FIG. 2 shows a control block diagram illustrating a hardware configuration of the label printer 1. The label printer 1 includes the CPU 51 that carries out various kinds of arithmetic processing and controls each unit. A ROM 52 that stores and saves fixed data in a fixed manner, and a RAM 53 that stores variable data in a rewritable manner and is used as a work area are bus-connected to the CPU 51. The CPU 51, the ROM 52, and the RAM 53 constitute a microcomputer 50 as a control unit that executes information processing and drive-controls each unit. For example, the microcomputer 50 executes various kinds of processing while using the RAM 53 as a work area according to a program code that is a computer program recorded as a firmware in the ROM 52. The RAM 53 is used as a work area, and functions, for example, as a storage unit that stores various kinds of information transmitted from a computer 60, to be described later. For example, the various kinds of information transmitted from the computer 60 include a plurality of data sets 401 that are correlated to respective labels 203 that are printed and issued, and these data sets 401 are temporarily stored in the RAM 53. Details of the data set 401 are shown in FIG. 3.

A head drive unit 54 that drive-controls the thermal head 115 and the motor 55, a sensor circuit 57 including the reflection type sensor 117 and the reflection type sensor 118, the RFID reader and writer 121, and a communication interface 56 are connected to the CPU 51 through various input and output circuits (not shown), and operations thereof are controlled by the microcomputer 50.

The head drive unit 54 is a digital circuit that drive-controls the thermal head 115 and the motor 55 on the basis of printing data. For example, the head drive unit 54 is an assembly of elements constituted by semiconductor technology. The motor 55 is a driving source that rotatably drives the conveying roller 106, the platen 107, the rewinder 108, the ribbon winding shaft 109, and the like. As an example, the motor 55 is a stepping motor that rotates in both forward and backward directions.

The sensor circuit 57 supplies power to the reflection type sensor 117 and the reflection type sensor 118, converts sensing signals transmitted from the reflection type sensor 117 and the reflection type sensor 118 into digital signals, and transmits these digital signals to the microcomputer 50.

The communication interface 56 realizes data communication with a computer 60 as an external device through a communication cable 58.

The computer 60 generates the data set 401 and transmits the data set 401 to the label printer 1. The computer 60 includes a central processing unit (CPU) 61, a read only memory (ROM) 62, a random access memory (RAM) 63 as a storage unit, an HDD 64, a CD-ROM drive 65, a communication interface 66, and the like, and is connected to the label printer 1 to freely communicate data. A program realizing various functions is stored in the HDD 64 of the computer 60. The CPU 61 carries out various kinds of information processing on the basis of description of the stored program.

FIG. 3 shows a schematic diagram illustrating a data configuration of the data set 401 stored in the RAM 53. The data set 401 is an assembly of data rows 404 constituted by a set of a data identifier 402 and actual data 403 corresponding to the data identifier 402. Examples of the data identifier 402 include an identifier "text" indicating that the actual data 403 is a character to be printed on the label 203, an identifier "bar code" indicating that the actual data 403 has a configuration of a bar code to be printed on the label 203, an identifier "RFID" indicating the actual data 403 is RFID data to be written on the RFID tag 206 that is included in the label 203, and the like. Among the data rows 404 included in the data set 401, the data row 404 in which the data identifier 402 is the "text", and the data row 404 in which the data identifier 402 is the "bar code" constitute printing data 410 to be printed on the label 203 by the printing unit 120. In addition, among the data rows 404 included in the data set 401, the data row 404 in which the data identifier 402 is the "RFID" constitutes RFID data 411 to be written on the RFID tag 206 included in the label 203 by the RFID reader and writer 121.

The data set 401 is generated in the computer 60 and is transmitted to the label printer 1. When receiving the data set 401 transmitted from the computer 60, the CPU 51 of the label printer 1 stores the data set 401 in the RAM 53 in a received sequence. The storage sequence of the data set 401 corresponds to an alignment sequence of the label 203 adhered to the label paper 201 in series.

As described above, the printing data 410 and the RFID data 411 which are included in each data set are paired in advance, and thus it is necessary to write the RFID data 411 (for example, "0001R"), which is correlated with the printing data 410, on the RFID tag on which the printing data 410 (for example, "0001L") is printed.

Figure 4:
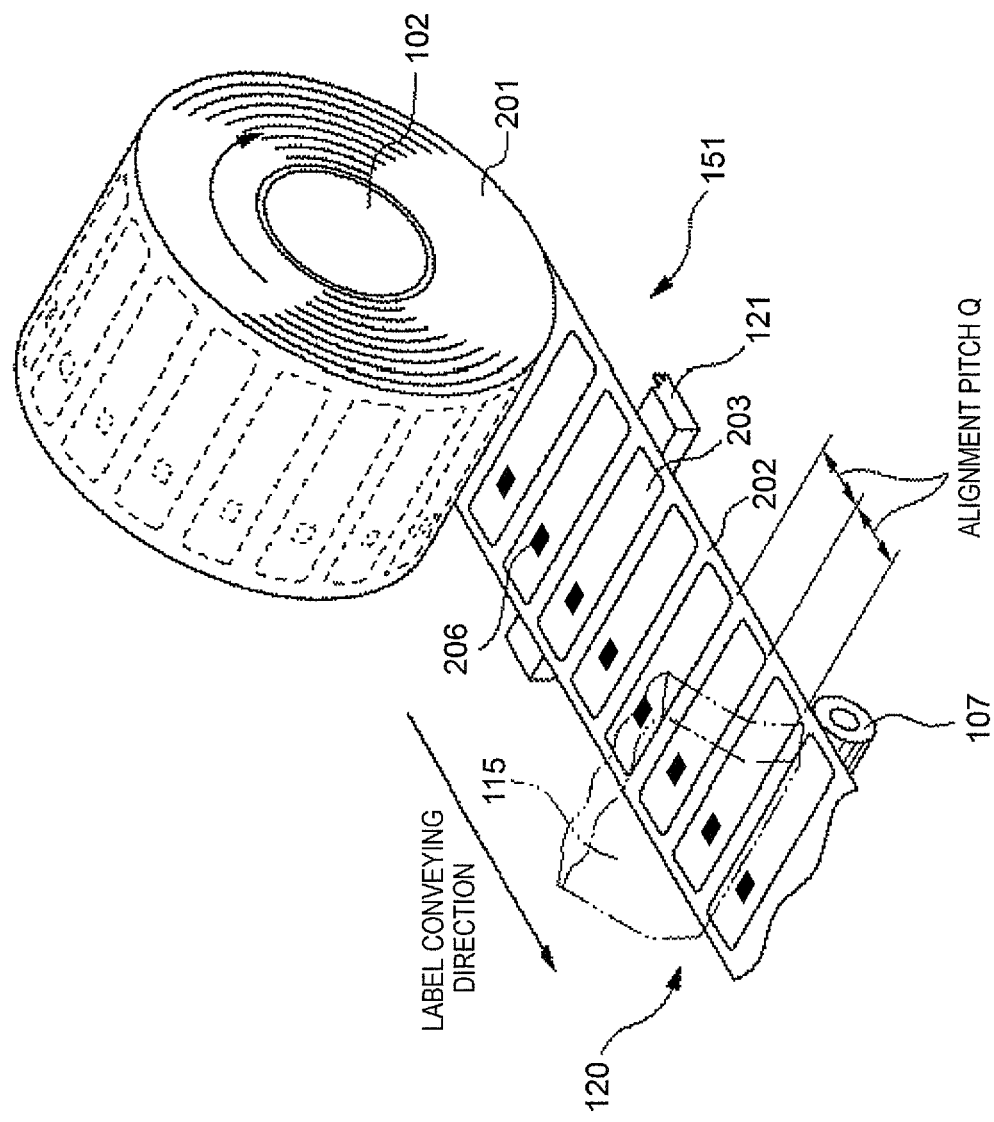
FIG. 4 is an external perspective view of an example of label paper.

FIG. 4 shows an external perspective view of the label paper 201. In the same drawing, a positional relationship between the label paper 201, the RFID reader and writer 121, and the printing unit 120 is also schematically illustrated.

The label paper 201 is held by the label paper holding shaft 102 in a state of being wound in a roll shape. In the label paper 201, a plurality of the labels 203 adhere on the mount 202 in series at a predetermined alignment pitch Q. The RFID tag 206 is embedded in each of the labels 203. As the RFID tag 206, for example, a passive type, in which a battery is not built-in, and the like may be employed. When an antenna that constitutes the RFID tag 206 receives a magnetic field emitted from a reader and writer antenna provided to the RFID reader and writer 121, electric power is generated in the RFID tag 206 and the RFID tag is activated. Wireless communication is carried out between the activated RFID tag 206 and the RFID reader and writer 121.

The printing unit 120 including the thermal head 115, the platen 107, and the like is disposed on downstream of the conveying route 151 in relation to the RFID reader and writer 121.

Figure 5:
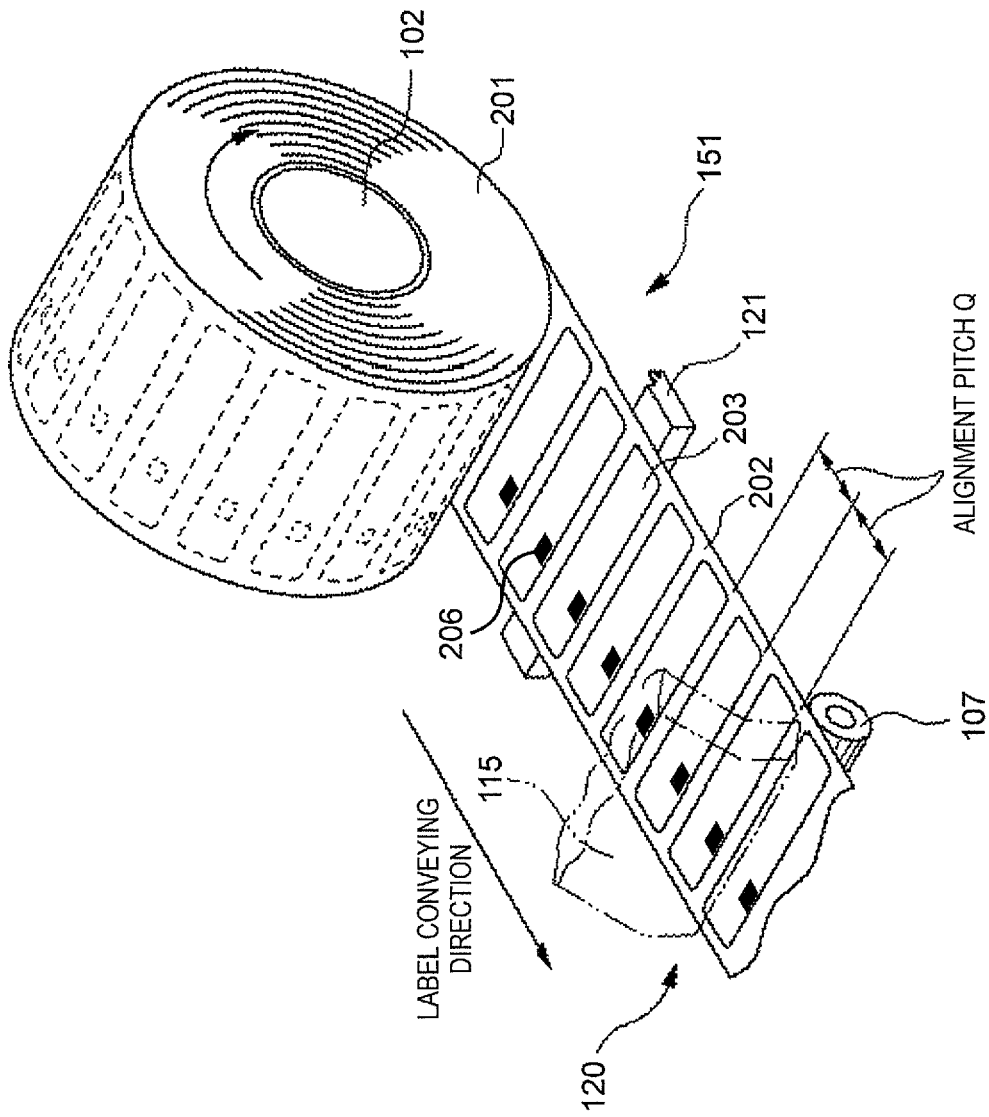
FIG. 5 is an external perspective view of an example of another label paper.
Figure 6:
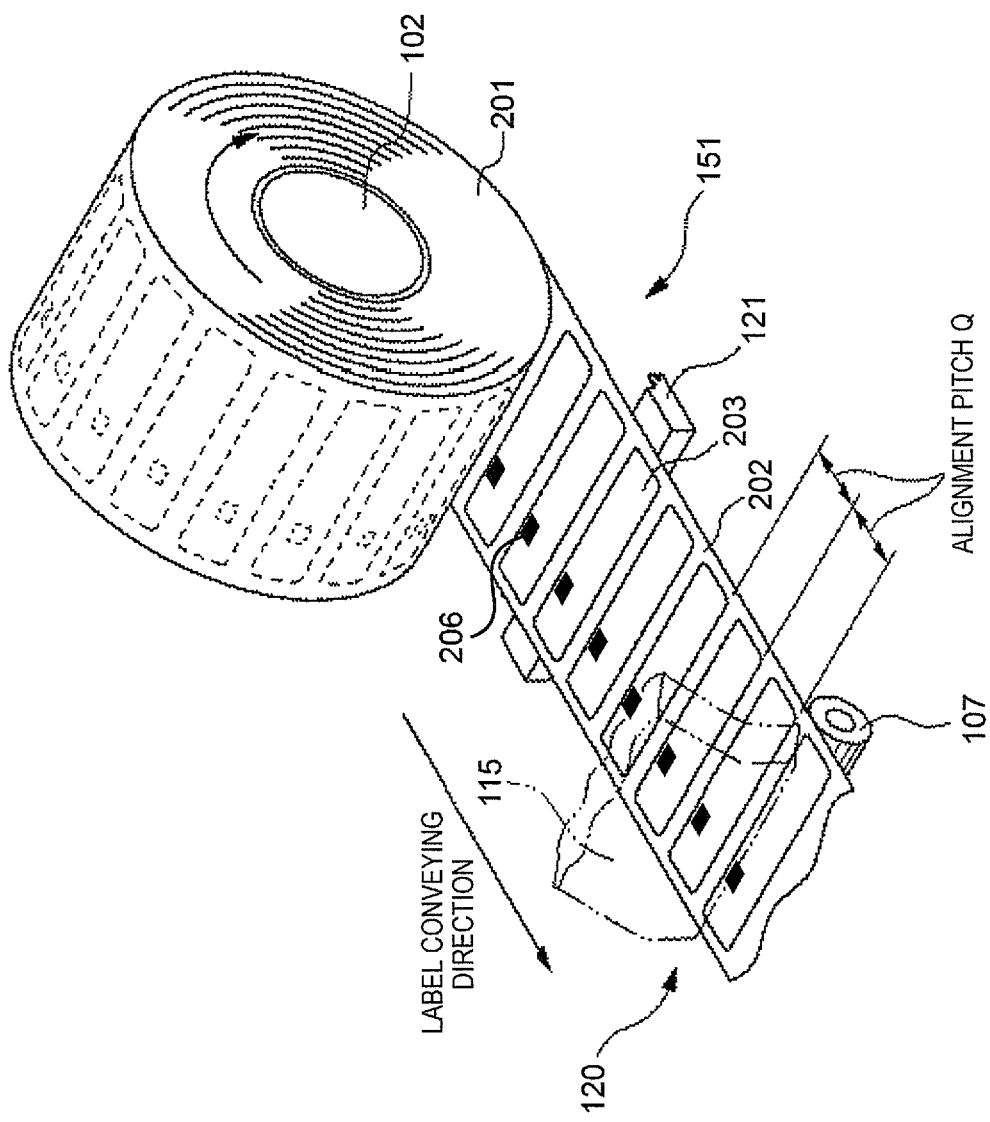
FIG. 6 is an external perspective view of an example of still another label paper.

In addition, as shown in FIGS. 4 to 6, the position of the RFID tag 206 in the label 203 is changeable, and examples of the position include a case in which the position is located at the central position of the label 203 in a sheet conveying direction (refer to FIG. 4), a case in which the position is located to be close to a downstream side end of the label 203 in the sheet conveying direction (refer to FIG. 5), a case in which the position is located to be close to an upstream side end of the label 203 in the sheet conveying direction (refer to FIG. 6), and the like.

Figure 8:
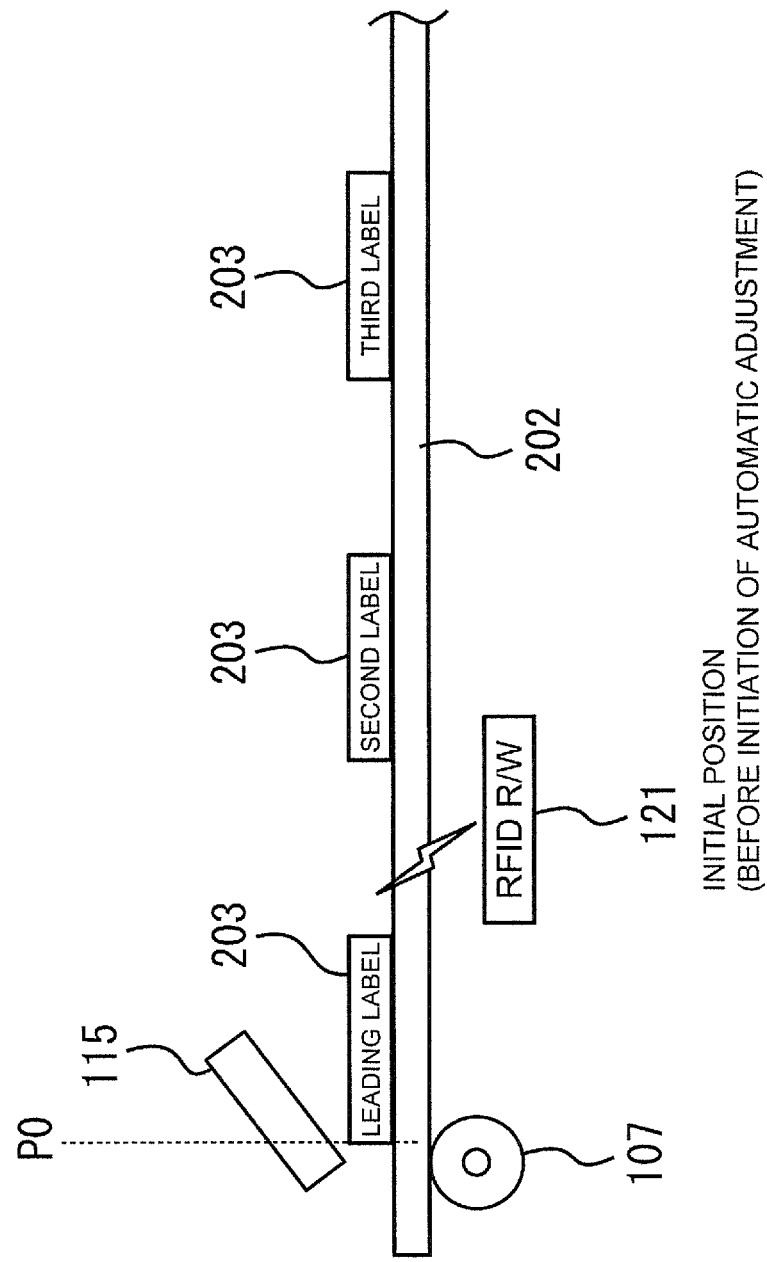
FIG. 8 is a conceptual diagram illustrating the method of searching the optimal communication position according to the embodiment.

Commonly, as shown in FIG. 1 and FIG. 8, to be described later, a label that is an object to be published is controlled by a sensor control or the like in such a manner that the leading end of the label to be printed is located immediately below the thermal head 115.

As shown in FIGS. 4 to 6, the RFID tag 206 that is embedded in each label may be different in an embedded position in the label depending on a kind of the labels, and the position of the RFID tag 206 may not be uniquely defined.

In addition, generally, as shown in FIG. 2, the antenna that communicates with the tag provided to the RFID reader and writer 121 is frequently disposed upstream of the sheet conveying direction in relation to the thermal head 115. Therefore, for example, if the position of the RFID tag 206 is located downstream of the label in the sheet conveying direction in an initial state (at the time of initiation of processing), the antenna may not stably communicate with the RFID tag 206 of the leading label in some cases.

Method of Searching Optimal Communication Position

When employing the method of searching an optimal communication position according to the embodiment, stable communication with the RFID tag embedded in the labels may be automatically realized regardless of the kind of labels that are used. Hereinafter, the method of searching the optimal communication position will be described.

Figure 7:
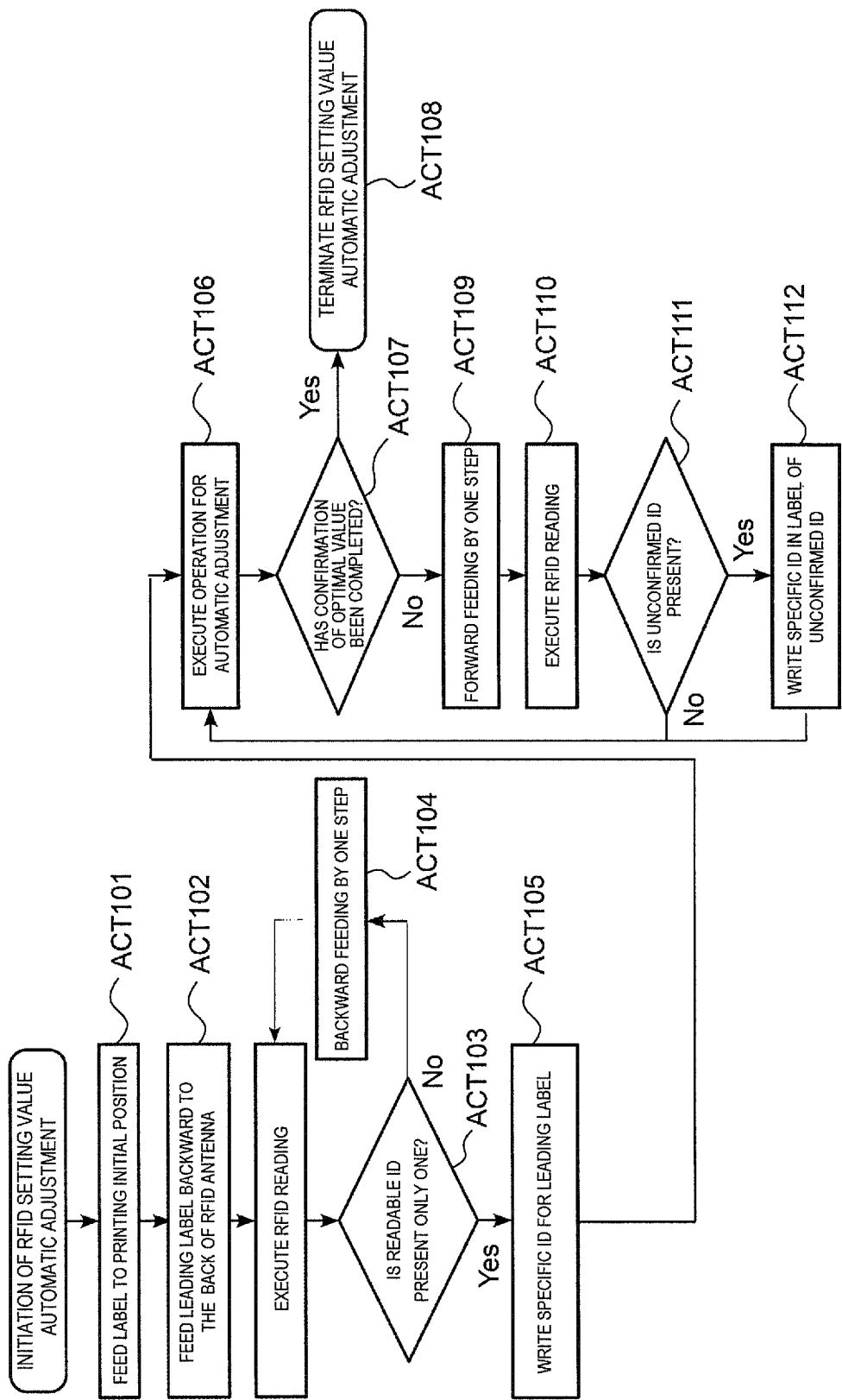
FIG. 7 is a flowchart illustrating a flow of a method of searching an optimal communication position in the label printer according to an embodiment.

FIG. 7 shows a flowchart illustrating a flow of the method of searching the optimal communication position in the label printer 1 according to the embodiment.

Figure 9:
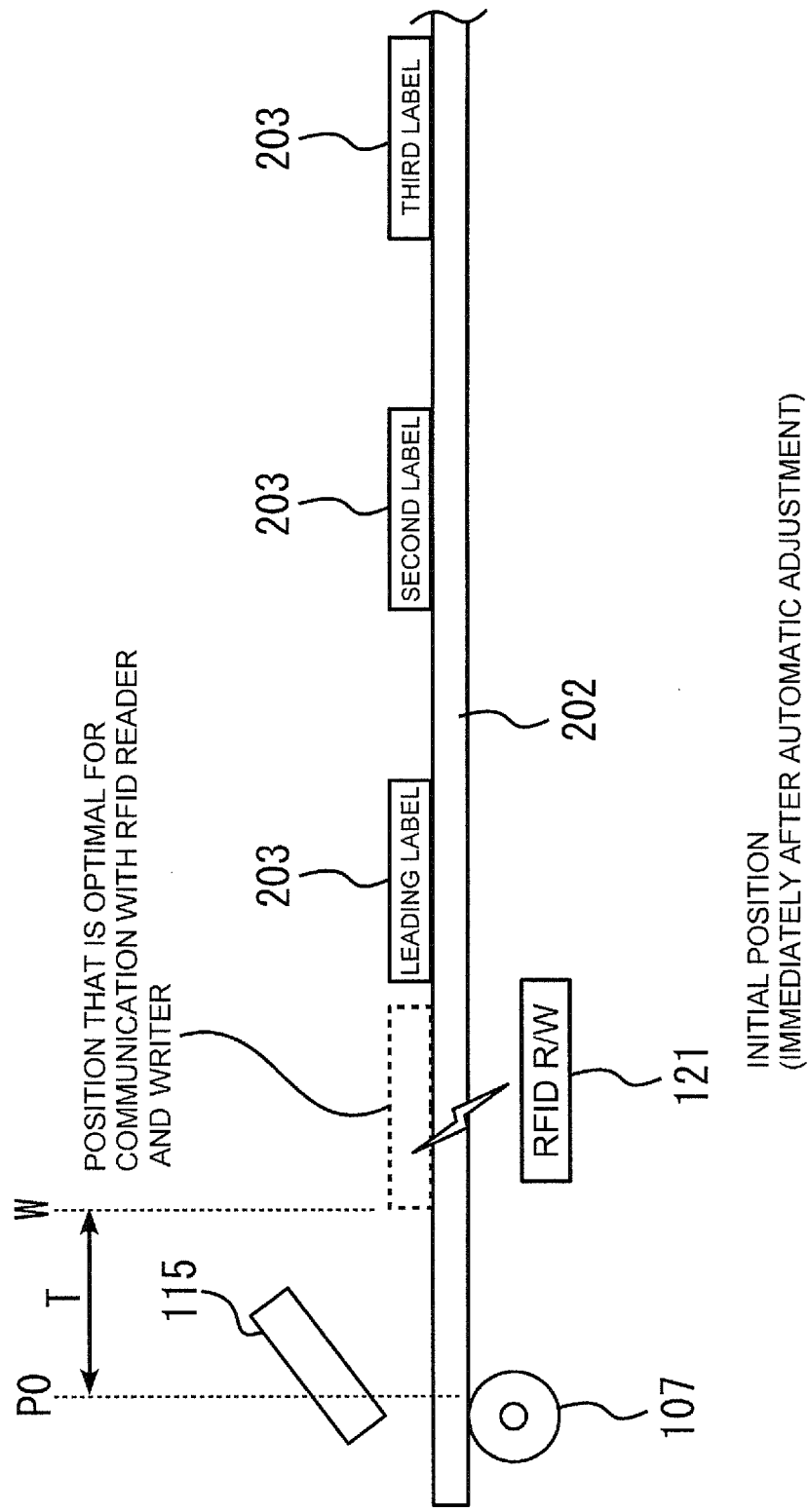
FIG. 9 is a conceptual diagram illustrating the method of searching the optimal communication position according to the embodiment.

First, the CPU 51 conveys a "leading label" to, for example, an initial position shown in FIG. 8 (ACT 101), and feeds the leading label backward to a position upstream of the sheet conveying direction in relation to the antenna of the RFID reader and writer 121 as shown in FIG. 9 (ACT 102).

In addition, here, the "leading label" represents the first leading label (label on the most downstream side in the sheet conveying direction) in which the RFID tag 206 are embedded among the plurality of labels 203 that adhered to the mount 202. If a plurality of labels 203 in which the RFID tag 206 is not embedded are present on a leading side, these labels are excluded from consideration.

After the backward feeding, if communication only with the "leading label" is possible in the RFID reader and writer 121 from the state of FIG. 9 (Yes in ACT 103), the CPU 51 allows the RFID reader and writer 121 to write a specific ID (for example, "1") for the leading label in the RFID tag.

On the other hand, after the backward feeding, in a state of FIG. 9, if the RFID reader and writer 121 enters a state in which communication with an RFID tag is also possible in addition to the RFID tag of the "leading label" (No in ACT 103), the CPU 51 drive-controls the conveying mechanism to feed the mount 202 backward by one step, thereby making the second label located at the back of the leading label be away toward an upstream side (ACT 104). In this manner, the CPU 51 feeds labels backward until the RFID reader and writer 121 enters a state in which communication with only the leading label is possible.

Then, the CPU 51 carries out an auto gain control (AGC) from the number giving position, and initiates a search for the optimal communication position (ACT 106).

Specifically, for example, as shown in FIG. 10, the label is conveyed downstream of the conveying direction by one step while monitoring a value of the AGC in the CPU 51, and the CPU 51 determines that a conveying distance at which the peak value of the AGC is obtained is present how many.

In an example shown in FIG. 10, the value of the AGC of the leading label varies to "3", "8", and "5", and the maximum value of the AGC is "8". In addition, a writing process when the AGC is "8" is successful, and thus it can be understood that stable writing in the leading label may be realized at the position when the AGC is "8".

The CPU 51 obtains the optimal communication position W (refer to FIG. 9) with respect to the leading label on the basis of a position "3 mm" when the maximum value is obtained (Yes in ACT 107) (ACT 108). For example, the optimal communication position W stated here becomes a distance T obtained by subtracting "a distance conveyed toward a downstream side until the AGC becomes the maximum value (3 mm in the example shown in FIG. 10)" from "a distance from a downstream side end of the leading label when the leading label is located at the initial position to a downstream side end of a printing region by the thermal head 115".

When setting of the optimal communication position is completed after the writing of the specific ID with respect to the leading label (ACT 108), the CPU 51 feeds the mount 202 forward by the conveying mechanism by one step (conveying toward a downstream side in the conveying direction) (ACT 109).

Then, the CPU 51 allows the RFID reader and writer 121 to read the tag, and determines whether or not an unconfirmed ID that is not confirmed is still read (ACT 111).

If an RFID tag having an unconfirmed ID is recognized (Yes in ACT 111), the CPU 51 allows the RFID reader and writer 121 to write a specific ID (for example, "2") in an RFID tag having the unconfirmed ID (ACT 112).

Then, searching for the optimal communication position is repeated in the same manner until the searching for the optimal value is completed (ACT 106 described above).

In addition, in the example illustrated in the flowchart of FIG. 7, the mount 202 is fed backward in a predetermined amount before searching for the optimal communication position, but there is no limitation thereto. For example, identification information may be given to each RFID tag while conveying the mount to a downstream side by one step as is without carrying out backward feeding.

Figure 11:
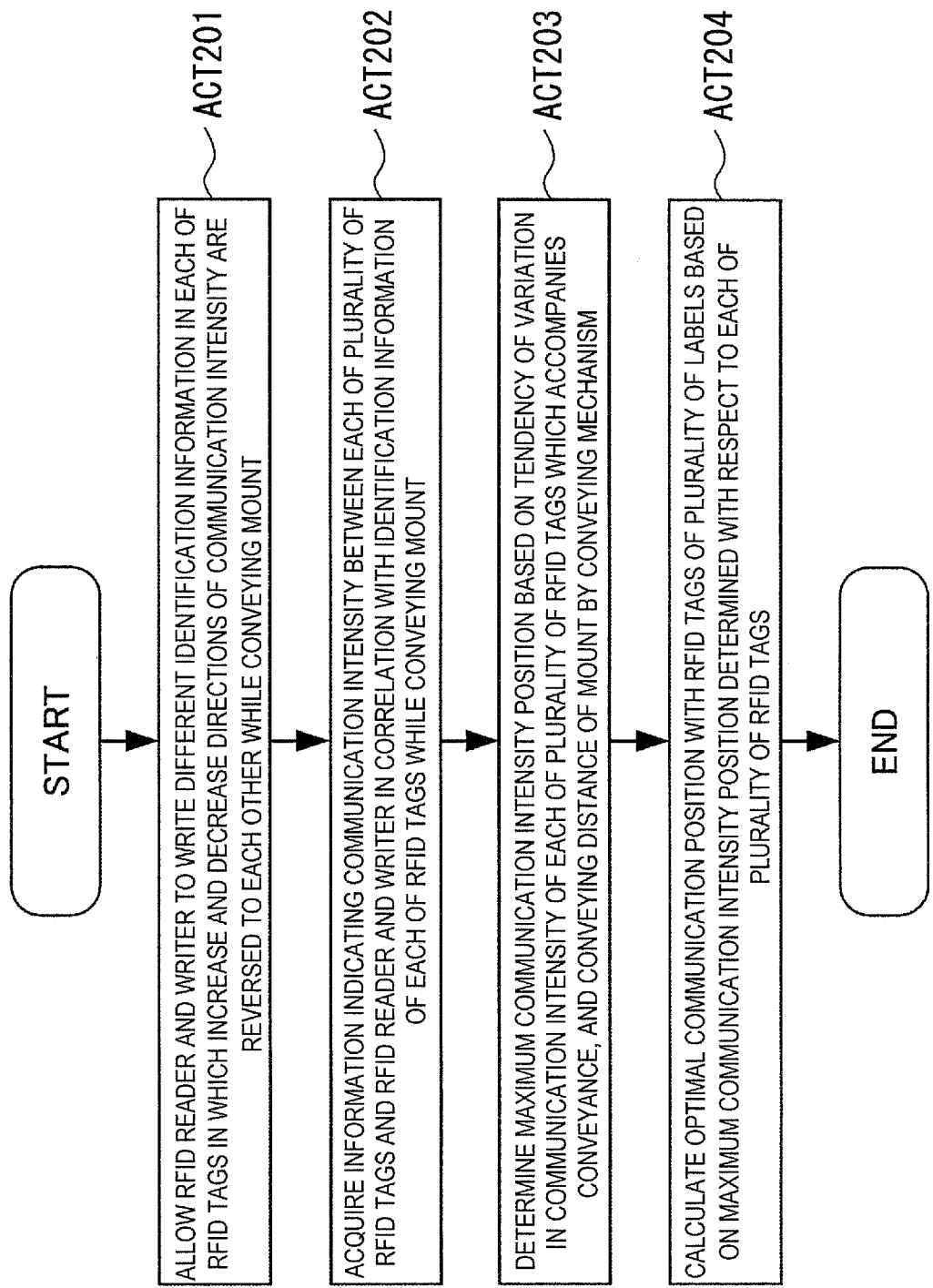
FIG. 11 is a flowchart illustrating a process of realizing the optimal communication position searching from a state in which communication with a plurality of RFID tags occurs simultaneously.

FIG. 11 shows a flowchart illustrating a method in which the backward feeding from the initial position is not carried out during searching for the optimal communication position. Here, description will be given to an example in a state in which the RFID reader and writer 121 receives signals from a plurality of RFID tags from initiation of the optimal communication position searching process different from the example shown in FIG. 10.

Even in this case, according to a method of searching an optimal communication position shown in FIG. 11, an optimal communication position with respect to each of the plurality of RFID tags with which communication occurs simultaneously may be searched.

First, the CPU 51 (identification information giving unit) allows the RFID reader and writer to write different identification information in each of the RFID tags in which increase and decrease directions of the communication intensity are reversed to each other on the basis of a variation in a communication intensity between each of the plurality of RFID tags and the RFID reader and writer which are in communication with each other when the mount 202 is conveyed by several millimeters (here, for example, 3 mm) for each time by the conveying mechanism along the conveying route toward a downstream side of the sheet conveying direction (ACT 201).

When searching for the optimal communication position is initiated, if a plurality of RFID tags are present in a communication range of the RFID reader and writer 121, for example, as shown in FIG. 12, AGC values of the plurality of RFID tags may be acquired simultaneously.

With regard to the AGC values of two RFID tags which are acquired here, a value of one RFID tag first reaches a peak at a position of 12 mm, and a value of the other RFID tag exceeds the value of the one RFID tag at a point of time of 21 mm.

That is, in the AGC values of both of the tags, a variation mode of increase and decrease is different in each case. Particularly, when moving from a position of 18 mm to a position of 21 mm, the AGC value of the other tag increases from "7" to "9" regardless of a decrease from "9" to "8" in the AGC value of the one tag.

Accordingly, from the difference in the variation tendency, it is proved that both of the AGC values are AGC values from tags different from each other.

Then, when writing specific identification information in a plurality of RFID tags, the CPU 51 (identification information giving unit) gives, for example, serial identification numbers sequentially from the RFID tag with which the communication intensity becomes the maximum for the first time during conveyance by the conveying mechanism.

At this time, specifically, the CPU 51 (identification information giving unit) may write the identification information in an "EPC region" or "USER region" in a storage region provided to the RFID tag.

In addition, if a unique identification number is given to each of the plurality of RFID tags that become search objects for the optimal communication position in advance, the giving of ID by the identification information giving unit is not necessary, and it may be initiated from a process of ACT 202, to be described later.

Continuously, if communication with the plurality of RFID tags occurs simultaneously in the RFID reader and writer while conveying the mount by the conveying mechanism along the conveying route, the CPU 51 (communication intensity information acquisition unit) acquires information indicating a communication intensity between each of the plurality of RFID tags and the RFID read and writer in correlation with identification information of each of the RFID tags (ACT 202).

Specifically, the CPU 51 (communication intensity information acquisition unit) acquires at least any of "electric field intensity" and "communication success rate" as information indicating the communication intensity. In addition, an example of the "electric field intensity" stated here, a value of a received signal strength indicator (RSSI) when the RFID reader and writer receives signals from the RFID tag, and the like may be exemplified.

In addition, as an example of the "communication success rate" stated here, as shown in FIG. 12, information indicating whether or not writing is successful may be employed.

Then, the CPU 51 (maximum communication intensity position determination unit) determines maximum communication intensity position, at which a communication intensity capable of being correlated with the identification information of each of the RFID tags becomes the maximum, on the basis of (1) a tendency of a variation in the communication intensity of each of the plurality of RFID tags which accompanies the conveyance along the conveying route, the communication intensity being acquired by the CPU 51 (communication intensity information acquisition unit), and (2) a conveying distance of the mount by the conveying mechanism (ACT 203). Specifically, in an example illustrated in FIG. 12, for example, an AGC value of an RFID tag to which the ID "1" is given transitions to "8", "8", "9", "10", "11", "10", and "9", and the maximum communication intensity position is "12 mm".

Finally, the CPU 51 (optimal communication position calculation unit) calculates an optimal communication position with the RFID tags of the plurality of labels adhered to the label paper on the basis of the maximum communication intensity position determined by the CPU 51 (maximum communication intensity position determination unit) with respect to each of the plurality of RFID tags (ACT 204).

In addition, the method of calculating the optimal communication position stated here may be carried out in the same manner as the method of calculating the distance T.

In addition, if communication between the plurality of RFID tags including RFID tags other than the first RFID tag and the RFID reader and writer occurs simultaneously at the maximum communication intensity position calculated with respect to a first RFID tag, the CPU 51 (threshold value calculation unit) calculates a threshold value for determining which RFID tag writing is to be carried out among the plurality of RFID tags.

Specifically, for example, if an RFID tag A, of which maximum communication intensity position is determined as 30 mm, is present, communication with an RFID tag other than the target RFID tag A may occur at the maximum communication intensity position in some cases.

Here, for example, if communication with three RFID tags (RFID tag A (target), RFID tag B, and RFID tag C) occur at the maximum communication intensity position (30 mm), and the communication intensity between each of the RFID tags and the RFID reader and writer is as follows: RFID tag A (first RFID tag): AGC 12 (first communication intensity), RFID tag B (second RFID tag): AGC 5 (second communication intensity), and RFID tag C: AGC 3, for example, the threshold value is set to "AGC 9" that is a value between the AGC 12 (first communication intensity) and AGC 5 (second communication intensity).

In the calculation of the threshold value, it is not necessary for the threshold value to be set to an intermediate value between the first communication intensity and the second communication intensity. For example, the threshold value in this case may be set to another value such as "8" and "10".

As described above, if reading and writing of data by the RFID reader and writer is carried out with respect to a plurality of labels adhered on the mount in a proximity state, communication with the plurality of RFID tags may occur simultaneously in some cases.

In this case, even when an attempt to determine the optimal position relationship for communication between the labels and the RFID reader and writer, if it is not specified that a signal received by the RFID reader and writer belongs to which RFID tag among the plurality of RFID tags that are in simultaneous communication with the RFID reader and writer, it is difficult to calculate the optimal communication position with respect to each of the RFID tags.

However, according to the configuration of the embodiment, since identification information of each of the RFID tags which are in simultaneous communication with the RFID reader and writer is correlated with a parameter indicating a communication state, information indicating a position of a tag during the communication state, or the like, calculation of the optimal communication position may be carried out with respect to each of the RFID tags while reliably identifying each of the plurality of RFID tags that are in simultaneous communication.

According to this configuration, the RFID reader and writer may accurately carry out writing of data in each of the RFID tags of a plurality of labels on the mount in an optimal position relationship, and thus occurrence of an error in which information to be written to an RFID tag of another label is erroneously written may be prevented.

In addition, the same identification information is not received from the plurality of RFID tags that become object to be read simultaneously, and thus misidentification of information indicating communication intensity acquired with respect to one RFID tag as information of the other RFID tag does not occur. According to this, it may be clarified that determination of the optimal communication position between an RFID tag and the RFID reader and writer is carried out with respect to which RFID tag among a plurality of RFID tags of labels on the mount.

Further, the program, which allows the above-described respective operations to be executed in the computer that constitutes the label printer, may be provided as a program that automatically adjusts an RFID writing setting value. In the embodiment, a case in which the program for realizing the function of carrying out the invention is recorded in advance in a storage region provided inside a device is exemplified, but there is no limitation thereto. The same program may be downloaded to the device through a network, or a program stored in a computer-readable recording medium may be installed in the device. The recording medium may be any type as long as the recording medium is capable of storing the program and is a computer-readable recording medium.

Specifically, examples of the recording medium include an internal storage device such as a ROM and RAM that are mounted inside a computer, a portable storage medium such as a CD-ROM, a flexible disk, a DVD disk, a magneto-optical disc, and an IC card, a database that retains a computer program, another computer and a database thereof, a transmission medium on the line, and the like. In addition, the function that is obtained in advance by installation and downloading as described above may be a function realized in synchronization with an operation system (OS) inside the device.

In addition, the program may be an execution module of which a part or entirety is dynamically generated.

In addition, it is needless to say that at least a part of various kinds of processing, which are realized by executing the program of the embodiment by a processor, may be executed in an ASIC in a circuit manner.

As described above in detail, according to the technology described in this specification, in a label printer having RFID reading and writing functions, a technology of automatically searching an optimal label position during writing of data in an RFID tag with respect to a label provided with the RFID tag may be provided.

What is claimed is:
1. A label printer, comprising:
   a conveying mechanism that conveys label paper, in which a plurality of labels including an RFID tag adhere to a long-length mount with a predetermined pitch along a longitudinal direction of the mount, along a conveying route;

a printing unit that carries out printing with respect to the labels on the conveying route;

an RFID reader and writer which is provided upstream of the conveying route in relation to the printing unit, and which carries out reading-in and writing-in of information with respect to the RFID tag included in each of the labels;

a communication intensity information acquisition unit that acquires information indicating a communication intensity between each of a plurality of the RFID tags and the RFID reader and writer in correlation with identification information of each of the RFID tags, if communication with the plurality of the RFID tags occurs simultaneously in the RFID reader and writer while conveying the mount by the conveying mechanism along the conveying route;

a maximum communication intensity position determination unit that determines a maximum communication intensity position, at which a communication intensity capable of being correlated with the identification information of each of the RFID tags becomes the maximum, on the basis of a tendency of a variation in the communication intensity of each of the plurality of RFID tags which accompanies the conveyance along the conveying route, the communication intensity being acquired by the communication intensity information acquisition unit, and a conveying distance of the mount by the conveying mechanism; and an optimal communication position calculation unit that calculates an optimal communication position with the RFID tags of the plurality of labels adhered to the label paper on the basis of the maximum communication intensity position determined by the maximum communication intensity position determination unit with respect to each of the plurality of RFID tags.

2. The label printer according to claim 1, further comprising:

an identification information giving unit that allows the RFID reader and writer to write different identification information in each of the RFID tags in which increase and decrease directions of the communication intensity are reversed to each other on the basis of a variation in a communication intensity between each of the plurality of RFID tags and the RFID reader and writer when the mount is conveyed by the conveying mechanism along the conveying route.

3. The label printer according to claim 2, wherein when writing the identification information in the plurality of RFID tags, the identification information giving unit gives serial identification numbers sequentially from the RFID tag with which the communication intensity becomes the maximum for the first time during conveyance by the conveying mechanism.

4. The label printer according to claim 2, wherein the identification information giving unit writes the identification information in an EPC region or a USER region in a storage region provided to the RFID tag.

5. The label printer according to claim 1, wherein the communication intensity information acquisition unit acquires at least any of an electric field intensity and a communication success rate as information indicating the communication intensity.

6. The label printer according to claim 5, wherein the communication intensity information acquisition unit acquires a received signal strength indicator (RSSI) value when the RFID reader and writer receives a signal from the RFID tag as the electric field intensity.

7. The label printer according to claim 1, further comprising:

a threshold value calculation unit that sets a threshold value, which determines to which RFID tag writing is to be carried out among the plurality of RFID tags when communication with the plurality of RFID tags occurs simultaneously in the RFID reader and writer, to a value which is equal to or higher than a second communication intensity and which is equal to or lower than a first communication intensity, if communication between the plurality of RFID tags including RFID tags other than the first RFID tag and the RFID reader and writer occurs at the maximum communication intensity position calculated with respect to a first RFID tag, when a communication intensity between the first RFID tag and the RFID reader and writer when the first RFID tag is positioned at the maximum communication intensity position calculated with respect to the first RFID tag is set as the first communication intensity, and a communication intensity between the RFID reader and writer and a second RFID tag in which communication with the RFID reader and writer occurs in a second highest communication intensity after the first RFID tag is set as the second communication intensity.

8. A method of searching an optimal communication position in a label printer including a conveying mechanism that conveys label paper, in which a plurality of labels including an RFID tag adhere to a long-length mount with a predetermined pitch along a longitudinal direction of the mount, along a conveying route, a printing unit that carries out printing with respect to the labels on the conveying route, and an RFID reader and writer which is provided upstream of the conveying route in relation to the printing unit, and which carries out reading-in and writing-in of information with respect to the RFID tag included in each of the label, the method comprising:

acquiring information indicating a communication intensity between each of a plurality of the RFID tags and the RFID reader and writer in correlation with identification information of each of the RFID tags, if communication with the plurality of RFID tags occurs simultaneously in the RFID reader and writer while conveying the mount by the conveying mechanism along the conveying route;

determining a maximum communication intensity position, at which a communication intensity capable of being correlated with the identification information of each of the RFID tags becomes the maximum, on the basis of a tendency of a variation in the acquired communication intensity of each of the plurality of RFID tags which accompanies the conveyance along the conveying route, and a conveying distance of the mount by the conveying mechanism; and calculating an optimal communication position with the RFID tags of the plurality of labels adhered to the label paper on the basis of the maximum communication intensity position determined with respect to each of the plurality of RFID tags.

9. The method according to claim 8, wherein the RFID reader and writer is allowed to write different identification information in each of the RFID tags in which increase and decrease directions of the communication intensity are reversed to each other on the basis of a variation in a communication intensity between each of the plurality of RFID tags and the RFID reader and writer when the mount is conveyed by the conveying mechanism along the conveying route.

10. The method according to claim 9,
wherein when writing the identification information in the plurality of RFID tags, serial identification numbers are given sequentially from the RFID tag with which the communication intensity becomes the maximum for the first time during conveyance by the conveying mechanism.

11. The method according to claim 9,
wherein the identification information is written in an EPC region or a USER region in a storage region provided to the RFID tag.

12. The method according to claim 8,
wherein at least any of an electric field intensity and a communication success rate is acquired as information indicating the communication intensity.

13. The method according to claim 12,
wherein a received signal strength indicator (RSSI) value when the RFID reader and writer receives a signal from the RFID tag is acquired as the electric field intensity.

14. The method according to claim 8,
wherein if communication between the plurality of RFID tags other than the first RFID tag and the RFID reader and writer occurs at the maximum communication intensity position calculated with respect to a first RFID tag, when a communication intensity between the first RFID tag and the RFID reader and writer when the first RFID tag is positioned at the maximum communication intensity position calculated with respect to the first RFID tag is set as a first communication intensity, and a communication intensity between the RFID reader and writer and a second RFID tag in which communication with the RFID reader and writer occurs in a second highest communication intensity after the first RFID tag is set as a second communication intensity, a threshold value, which determines which RFID tag writing is to be carried out among the plurality of RFID tags when communication with the plurality of RFID tags occurs simultaneously in the RFID reader and writer, is set to a value which is equal to or higher than the second communication intensity and which is equal to or lower than the first communication intensity.

\* \* \* \* \*